(No Model.)

A. E. SMITH.
AXLE FOR VEHICLES.

No. 248,806. Patented Oct. 25, 1881.

WITNESSES.
George L. Cumine.
Thos. H. Connery.

INVENTOR.
Alfred E. Smith

United States Patent Office.

ALFRED E. SMITH, OF BRONXVILLE, NEW YORK.

AXLE FOR VEHICLES.

SPECIFICATION forming part of Letters Patent No. 248,806, dated October 25, 1881.

Application filed February 9, 1881. (No model.)

*To all whom it may concern:*

Be it known that I, ALFRED E. SMITH, of Bronxville, in the county of Westchester and State of New York, have invented new and useful Improvements in Axles for Vehicles, of which the following is a specification.

This invention relates to certain improvements in axles for vehicles; and it consists in the combination of an axle having an enlarged bearing at its inner end, with an incline to a smaller journal, near the outer end of which is an annular groove followed by a tapering or conical end, with a box conforming to it until it reaches the inner edge of the groove, and into which groove a divided collar or ring with a conical edge is put, which bears against the sides of the groove and the front end of the box, and which tapers in a line with the taper on the front end of the axle, and over which is passed a cap-nut which screws upon the front end of the box for the purpose of keeping the box in the hub, the collar in the groove which locks the axle to the box, and bearing upon the taper end of the spindle, and the taper edge of the collar makes a shoulder for the cap-nut, for the purpose of lengthening the bearing on the axle and drawing away the box from the incline near the inner end of the axle, and preventing a noise that would occur if the box should thrust against the incline or shoulder from the enlarged to the diminished spindle, and thereby saving the expense and necessity of using washers or other device to deaden noise, the axle-box being held in place upon its spindle, with its inner surface conforming to its journal-bearings, and kept in place by a collar having a conical edge, which revolves in a groove near the front end of the axle, and over which passes a cap-nut which is screwed upon the front end of the box, preventing the escape of lubricant or the ingress of water or dirt, as more fully hereinafter set forth.

Figure 1:
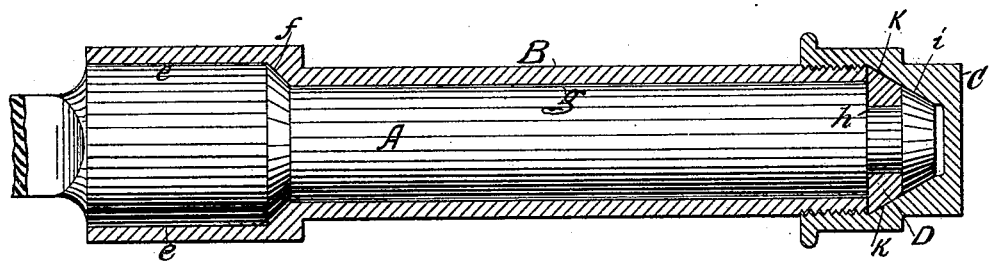
Figure 2:
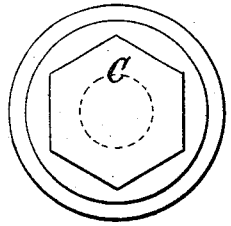
Figure 4:
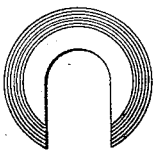
Figure 3:
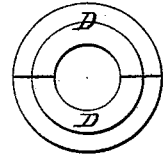

Figure 1 represents a longitudinal view of an axle and sectional view of an axle-box, a divided conical collar, an annular groove, the conical end of the axle, and a screw-cap. Fig. 2 represents an end view of the screw-cap. Fig. 3 represents an end view of the conical-edged divided collar. Fig. 4 shows a forked collar with a beveled edge.

Letter A in Fig. 1 represents an axle; letter B, an axle-box; letter C, a cap-nut; letter D, a divided conical-edged revolving collar or a forked collar, as shown in Fig. 4. $e$ shows an enlarged bearing of the axle; $f$, the incline or shoulder; $g$, the reduced bearing portion of the axle; $h$, the annular groove near the outer end of the axle; $i$, the tapering end of the axle; $k$, the taper edge of the collar.

Having now described my invention, I desire to claim—

An axle for vehicles, constructed with a conical-shaped end and an annular groove, combined with a conical-edged collar or ring, a cap-nut having an inner tapering bearing-surface conforming with the axle end and collar, and an axle-box with a screw-threaded end to receive the cap-nut, all substantially as and for the purposes described.

In testimony whereof I have hereunto set my hand and seal in the presence of two subscribing witnesses.

ALFRED E. SMITH. [L. S.]

In presence of—
THOMAS H. COOK,
THOS. A. CONNERY.